March 5, 1974            D. T. POE            3,795,543

BI-POLAR LEAD-ACID STORAGE BATTERY

Filed June 29, 1972

United States Patent Office 3,795,543
Patented Mar. 5, 1974

3,795,543
BI-POLAR LEAD-ACID STORAGE BATTERY
David T. Poe, Gaston, Ind., assignor to General Motors Corporation, Detroit, Mich.
Filed June 29, 1972, Ser. No. 267,503
Int. Cl. H01m 39/06
U.S. Cl. 136—10                                 1 Claim

ABSTRACT OF THE DISCLOSURE

A bi-polar, mat-immobilized-electrolyte, lead-acid storage battery having hydrogen relief ports through the negative plate to reduce hydrogen film polarization of the negative plate.

---

This invention relates to a bi-polar, lead-acid storage battery in which the positive and negative plates in each cell are closely spaced from each other and have a microporous, tree-suppressing separator and a macroporous, electrolyte-immobilizing mat packed between them. More particularly, this invention relates to cells of the aforesaid type which also have electrolyte reservoirs behind each of the cell's plates.

In closely packed cells of the type described, hydrogen formed during charging becomes trapped behind the microporous separator and on the surface of the negative plate. The trapped hydrogen forms a passivating film over the negative plate which reduces its contactability by the electrolyte and results in negative electrode polarization and increased internal cell resistance. The closer the positive and negative plates are spaced, the more acute the problem becomes with interelectrode spacings of less than about 0.03 inch being a particular problem.

It is therefore an object of this invention to vent the hydrogen formed on recharge through the negative plate to the backside thereof where it eventually bubbles out of the cell without a substantial polarizing effect on the negative electrode. This and other objects of this invention will become more clear from the following detailed description in which.

This invention comprehends a bi-polar electrode, lead-acid storage battery having a microporous, tree-suppressing, separator and a macroporous electrolyte-immobilizing mat compressed between closely-spaced positive and negative plates forming each cell, and in which the negative plate has a plurality of holes or relief ports extending through it from one face to the other. The relief ports vent hydrogen from the front side of the negative plate to an electrolyte reservoir behind the plate from where it can escape to the battery's venting system without leaving a residual polarizing film on the negative electrode after charging.

Figure 1:
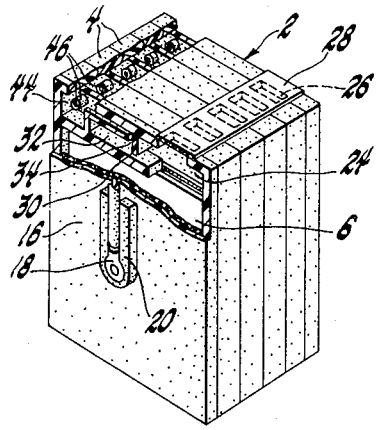
FIG. 1 is a partially broken away, perspective view of a battery of bi-polar electrode cells.
Figure 2:
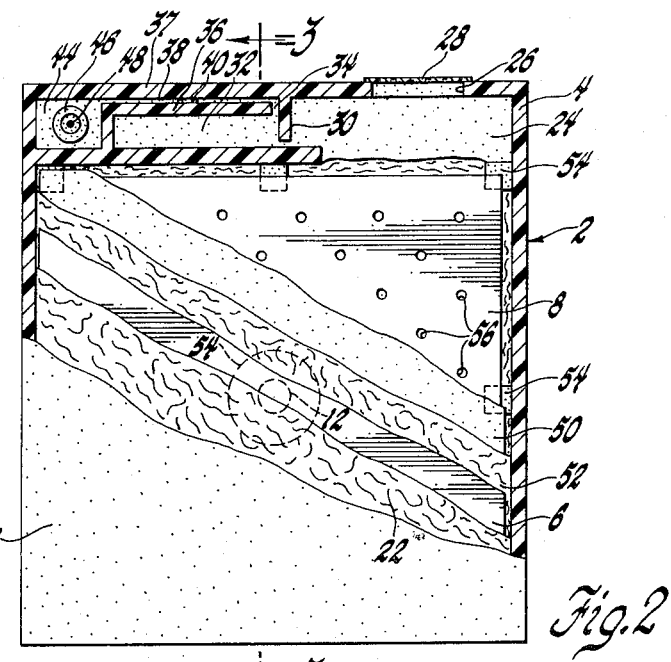
FIG. 2 is a partially broken away, sectioned, end view of the end cell in the battery of FIG. 1.
Figure 3:
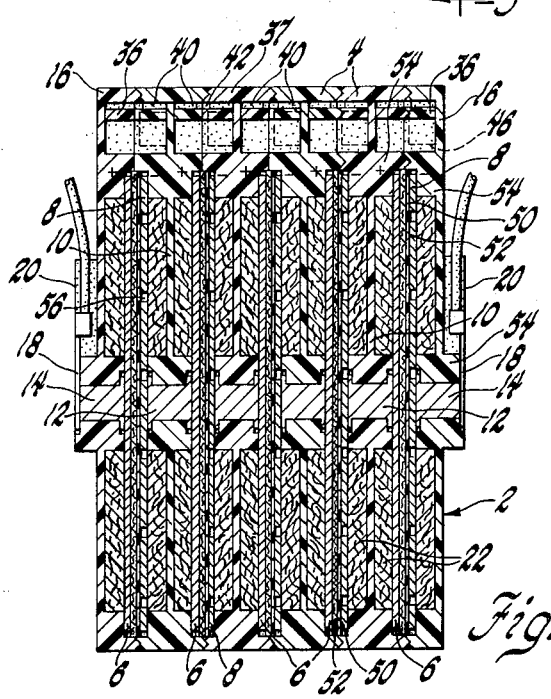
FIG. 3 is a sectioned, side elevational view of the battery taken along the line 3—3 of FIG. 2.

In the figures, there is shown a battery 2 comprising a stack of a plurality of bi-polar half-cell elements 4 joined together along their mating surfaces. As best shown in FIG. 3, each half-cell unit 4 includes a positive plate 6, a negative plate 8 and an intercell divider or web 10 which prevents direct electrolyte communication between the positive and negative plates of any one half-cell element. The positive and negative plates, 6 and 8 respectively, of each half-cell element 4 are electrically joined by a connector 12 which sealingly passes through the web 10 at central boss 54 and serves to space the plates from the web 10 and thereby form an electrolyte reservoir behind the plates. Though only one central connector 12 is shown, a number of connectors may be used for each plate couple if a more uniform current collection is needed. The terminal cells of the battery are closed off by end elements 16 each of which carry only a single plate, positive on one and negative on the other. The plates on each end element 16 is joined to the battery's external terminals 18 by connectors 14. The terminals 18 are conveniently contained within an appendage 20 formed on the face of the end element 16.

Though it is preferred that the web 10 be nonconductive and formed as a single unit with a nonconductive border, it is not necessary that it be such. For example, the web 10 could be a continuous sheet of metal, e.g., lead, which is sealed on its periphery to the nonconductive frame. The frames are joined to like frames on adjacent half-cell elements 4 to form a finished battery stack. The frames preferably comprise any of a number of plastics such as polypropylene, polyethylene, polystyrene and the like, as well as their respective copolymers. Also included are thermosetting materials such as conventional battery box rubbers and the like. The several half-cell elements 4 are stacked with their frames contiguous and appropriately sealed to one another as by any known technique (e.g., solvents, adhesives, heat, etc.) consistent with the composition of the frame material.

In a preferred embodiment, bibulous mats 22 are provided in the electrolyte reservoirs between the plates 6 and 8 and the web 10 of each cell. The mats 22 absorb and immobilize the electrolyte in the reservoirs and keep it from splashing out of the cell region and into the venting system described hereafter. The bibulous mats 22 preferably comprise a "lofty," non-woven fabric formed of a material which is not attacked by the acid electrolyte and which will substantially retain its shape throughout the life of the battery. Such mats typically comprise polypropylene, copolymers of vinyl chloride and acrylonitrile (i.e., Dynel) or the like and have a porosity of about 95% in the uncompressed state. They are slightly compressed when placed between the plates 6 and 8 and the web 10 to insure contact with the backside of the plates and complete filling of this electrolyte reservoir. A preferred such mat comprises Dynel having a thickness of about 0.09 inch and has an apparent density of about 0.00086 g./in.$^2$ per mil of thickness.

At the time the half-cell elements 4 are assembled to form the battery stack and with the mats 22 already in place, microporous tree-suppressing separators 50 and electrolyte-immobilizing mats 52 are inserted between the positive plate 6 of one bi-polar half-cell element 4 and the negative plate 8 of the next adjacent bi-polar half-cell element 4. The separator 50 is of the type used in lead-acid batteries and comprises a thin, microporous, ion-permeable sheet of a material such as rubber, paper, polyethylene, polyvinyl chloride or the like. This separator 50 suppresses interelectrode shorting otherwise caused by "treeing" between the plates. I prefer to use a polymer sheet which is about 10 mils thick and has a nominal pore size of about 0.15 micron diameter. The mats 52 comprise the same material as mats 22, but are compressed considerably more during assembly of the bi-polar half-cell elements 4 to form the individual cells of the battery. In this regard, mats 52 which are about 0.09 inch thick before assembly and compression become about 0.02 inch thick after compression with a corresponding decrease in porosity of the portion of the mat between the plates. In addition to being an excellent electrolyte wick, the compressed mat 52 asserts pressure on the faces of the plates which reduces shedding of the active materials, insures more uniform spacing between the plates and increases the rigidity of the plates thereby contributing to the shock and vibration resistance of the battery as a whole. The compressed mat 52 causes the separator 50 to press tightly against the negative plate 8 and, as a result, the hydrogen gas generated on recharge is not free to leave the front face of the negative plate 8 and resulting in the formation of a polarizing film which increases the internal resistance of the battery.

Openings 26 are provided in the top of each cell for filling the battery with electrolyte after assembly. After filling, the openings are permanently closed by any appropriate means such as tape 28, potting compound, hot melt etc.

To avoid the formation of a polarizing hydrogen film over the face of the negative plate 8, a plurality of relief ports 56 are provided through the plate to communicate the front face with the electrolyte reservoir behind the plate. The relief ports 56 typically have a diameter of about 0.09 inch and are distributed across the negative plate 8 at a density of about five ports per square inch. The hydrogen gas which would otherwise build up on the front face of the negative electrode 8 passes harmlessly through the ports 56 into the electrolyte reservoir between the plate 8 and the web 10. From there it eventually percolates upwardly to the top of the cell and into the venting system which is described in more detail hereafter.

The gas formed on charge is vented from the cell through a tortuously pathed venting system which, coupled with the absorbent mats 22 and 52, substantially prevent liquid electrolyte from escaping from the cell. In this regard, the saturated mats 22 and 52 hold most of the electrolyte by surface tension effects in the region of the plates, front and back. Nonetheless, some electrolyte can escape the mat by either being entrained in the evolving hydrogen or being thrown free from the mats during periods of rough handling. To prevent this mat freed electrolyte from escaping from the battery and to insure that there is no electrolyte path between cells to cause internal shorting, yet still provide adequate venting capacity, a highly tortuous venting system is provided. In the particular embodiment shown, the components of the venting system are molded in a single operation into each half-cell element 4. These components include a combination of baffles and restrictions over and through which the vented gases pass while traversing from one side of the battery to the other and which separate any entrained electrolyte from gas as well as prevent any free liquid from establishing a continuous conduction path between cells. In the system shown in the figures, the hydrogen exits each cell through the opening 24 located beneath the filler opening 26 and over the plates 6 and 8. The gases rising through the opening 24 enter the venting system by first passing beneath depending baffle 30 and into the chamber 32. From chamber 32, the gas flow changes direction and moves vertically through the narrow restriction 34 formed between the baffle 30 and the end of ledge 36. After passing through restriction 34, the gas again changes direction and flows horizontally through a narrow channel 38 formed between the ledge 36 and the upper portion of the outer peripheral wall 37 which circumscribes the half-cell element and, in part, forms the battery's case. Baffles 40 are spaced apart in the channel 38 to form a narrow restriction 42 through which the gas passes before entering venting manifold chamber 44. The venting manifold chamber 44 contains a projecting tubular baffle 46 extending out from and surrounding aperture 48 through the web 10 which aperture 48 communicates the chamber 44 of one half-cell element 4 with a like chamber 44 on the next adjacent half-cell element 4. The several chambers 44 are aligned to form a venting manifold for the entire battery which finally opens to the atmosphere through an aperture (not shown) in the end element 16.

In one specific example, a battery is made in accordance with this invention which is four inches wide and four and five sixteenth inches high including the venting system. The length of the battery will vary with the number of cells desired. In such a battery the webs 10 are spaced apart about 0.49 inch and the positive and negative plates 6 and 8 are of the pasted type on lead-calcium positive and negative plate grids. The positive plate 6 is pasted to about 0.094 inch thick and contains about 52 grams of positive active material while the negative plate 8 is pasted to about 0.069 inch thick with about 46 grams of negative active material. Hydrogen venting ports are drilled through each negative plate. These ports are about 0.09 inch in diameter and there are about 5 ports per square inch of negative plate. The positive and negative plates are spaced apart about 0.03 inch and about 0.15 inch from the web 10 by means of bosses 54.

Performancewise, otherwise identical cells with and without vent ports 56 in the negative plates have shown significantly different cell voltages after charge. In this regard, under a 30 amp, 80° F. discharge the cells without the ports displayed a voltage of only 1.41 volts in contrast to 1.62 volts for the cells having the hydrogen relief ports.

While this invention has been disclosed primarily in terms of a specific embodiment thereof, I do not intend to be limited thereto except to the extent hereinafter defined.

I claim:
1. A bi-polar, lead-acid storage battery including a plurality of cells each of which comprises a tortuously vented container having walls defining a cell chamber; a first plate of one polarity spaced from one of said walls providing first reservoir means for cell electrolyte in the space between said one polarity plate and said wall; an opposite polarity plate spaced from another of said walls opposite said one wall providing second reservoir means for cell electrolyte in the space between said opposite polarity plate and said other wall; said plates being closely spaced one from the other in said cell and said first plate being electrically connected through said one wall to an opposite polarity plate in a next adjacent cell; a microporous, tree-suppressing, ion-permeable separator between said plates in said one cell and contiguous the negative polarity plate; a bibulous, acid-wicking, acid-absorbent polymeric mat significantly compressed between the positive polarity plate and said separator and holding said separator tightly against said negative polarity plate; and a plurality of apertures through said negative polarity plate communicating the separator side of that plate with the reservoir behind it whereby hydrogen gas formed during recharge is vented away from the separator side of the negative polarity plate to the reservoir behind it where the hydrogen can escape the cell without an appreciable polarizing effect on the negative electrode.

References Cited
UNITED STATES PATENTS

| | | | |
|---|---|---|---|
| 2,635,127 | 4/1953 | Yardney et al. | 136—6 S |
| 3,141,795 | 7/1964 | Eisler | 136—26 X |
| 3,333,986 | 8/1967 | Chreitzberg et al. | 136—6 B |
| 3,457,112 | 7/1969 | Reber | 136—26 |
| 3,553,020 | 1/1971 | Corbin et al. | 136—166 |

ANTHONY SKAPARS, Primary Examiner

U.S. Cl. X.R.

136—26